US012594732B2

(12) United States Patent
Lee

(10) Patent No.: US 12,594,732 B2
(45) Date of Patent: Apr. 7, 2026

(54) AUTOMATED FIBER PLACEMENT DEVICE FOR PREFORM MANUFACTURING

(71) Applicants: Hyundai Motor Company, Seoul (KR); Kia Corporation, Seoul (KR)

(72) Inventor: Yong Beom Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 30 days.

(21) Appl. No.: 17/966,062

(22) Filed: Oct. 14, 2022

(65) Prior Publication Data

US 2023/0124245 A1 Apr. 20, 2023

(30) Foreign Application Priority Data

Oct. 18, 2021 (KR) ........................ 10-2021-0138049

(51) Int. Cl.
*B29C 70/38* (2006.01)
*B29C 70/18* (2006.01)
*B29C 70/34* (2006.01)
*B29C 70/54* (2006.01)
*B29K 105/08* (2006.01)

(52) U.S. Cl.
CPC ............ *B29C 70/382* (2013.01); *B29C 70/18* (2013.01); *B29C 70/34* (2013.01); *B29C 70/545* (2013.01); *B29K 2105/0872* (2013.01)

(58) Field of Classification Search
CPC ....... B29C 70/382; B29C 70/18; B29C 70/34; B29C 70/545; B29C 70/384; B29K 2105/0872
See application file for complete search history.

(56) References Cited

U.S. PATENT DOCUMENTS

| | | | | |
|---|---|---|---|---|
| 7,810,539 B2 * | 10/2010 | Mischler | .............. | B29C 70/382 |
| | | | | 156/580 |
| 8,486,216 B2 * | 7/2013 | Bruyere | ................ | B29C 70/382 |
| | | | | 156/297 |
| 9,266,279 B2 * | 2/2016 | Benson | .......... | B29K 2105/0872 |
| | | | | 264/288.4 |

(Continued)

FOREIGN PATENT DOCUMENTS

| | | | | |
|---|---|---|---|---|
| KR | 10-2015-0144768 A | 12/2015 | | |
| WO | WO-2021030541 A2 * | 2/2021 | ............. | B29C 70/52 |

OTHER PUBLICATIONS

S. Sun et al., "Defect Characteristics and Online Detection Techniques During Manufacturing of FRPs Using Automated Fiber Placement: A Review", Polymers, 2020, vol. 12, pp. 1-22.

*Primary Examiner* — Alison L Hindenlang
*Assistant Examiner* — Alexander A Wang
(74) *Attorney, Agent, or Firm* — Fox Rothschild LLP

(57) ABSTRACT

Disclosed is an automated fiber placement (AFP) device for preform manufacturing. The AFP device includes a feeder configured to feed a sheet-type fiber composite material, a molding part configured to mold a sheet-type structure by allowing a roller member to compress the sheet-type fiber composite material, and a compressing part configured to compress an upper surface of the structure, thereby disposing the sheet-type structure on a substrate in a state of maintaining the shape of the sheet-type structure. Particular, the compressing part moves from one end to the other end of the substrate, thereby compressing the sheet-type structure.

17 Claims, 9 Drawing Sheets

(56) References Cited

U.S. PATENT DOCUMENTS

| | | | | |
|---|---|---|---|---|
| 10,434,726 | B1 * | 10/2019 | Hickman | B29C 70/34 |
| 10,751,954 | B2 * | 8/2020 | Wadsworth | B29C 70/382 |
| 2005/0023728 | A1 * | 2/2005 | Benson | B29C 70/504 |
| | | | | 425/374 |
| 2007/0044922 | A1 * | 3/2007 | Mischler | B29C 70/382 |
| | | | | 156/577 |
| 2008/0023130 | A1 * | 1/2008 | Gomez | B32B 37/0046 |
| | | | | 156/361 |
| 2012/0007278 | A1 * | 1/2012 | Benson | B29C 55/18 |
| | | | | 425/374 |
| 2013/0221568 | A1 * | 8/2013 | Shindo | B29C 43/222 |
| | | | | 264/258 |
| 2015/0314539 | A1 * | 11/2015 | Sanchez Gomez | B29C 70/543 |
| | | | | 156/510 |
| 2019/0118410 | A1 * | 4/2019 | Caffiau | B29B 11/16 |

* cited by examiner

AUTOMATED FIBER PLACEMENT DEVICE FOR PREFORM MANUFACTURING

CROSS REFERENCE TO RELATED APPLICATION

The present application claims priority to Korean Patent Application No. 10-2021-0138049, filed Oct. 18, 2021, the entire contents of which are incorporated herein for all purposes by this reference.

TECHNICAL FIELD

The present invention relates to an automated fiber placement device for use in preform manufacturing so as to arrange fiber composite materials.

BACKGROUND OF THE INVENTION

An automated fiber placement (AFP) technique has been introduced in the 1970s in the aerospace industry. The AFP technique (e.g., devices) combines merits of filament winding and automated tap laying and is one of the automated manufacturing techniques rapidly growing and effective in the composite material technical field.

The AFP device enables fiber composite materials such as tow preg and prepreg to be arranged in a straight strip or a curved shape. The AFP device also enables preform manufacturing with more precise and constant fiber arrangement compared to the conventional manual processes.

Conventionally, when manufacturing preforms by using AFP, defects such as gap and overlapping may occur, causing degradation in initial appearance quality of the product and mechanical properties thereof.

In the related art, among the methods of solving these defects, a method of automatically arranging fiber composite materials as appropriate through design, with minimizing overlapping of the fiber composite materials, has been introduced. However, the method of overlapping and arranging the fiber composite materials may cause another defect due to generation of step differences.

In addition, a method of changing the shapes of the fiber composite materials has been introduced. However, this method may increase the production cost due to an additional process.

Under the circumstances, research on automated fiber placement devices available for continuous processes and minimizing defects such as gap, overlapping between the fiber composite materials upon manufacturing the preforms is required.

SUMMARY OF THE INVENTION

In preferred aspects, provided herein, inter alia, is an automated fiber placement (AFP) device available for continuous processes and configured to minimize defects such as gap, overlapping the fiber composite materials upon manufacturing preforms.

Also provided is an automated fiber placement (AFP) device for preform manufacturing, the device being configured to minimize generation of step differences when the fiber composite materials are overlapped, by changing the shapes of the fiber composite materials.

The present invention is not limited to the above-described objective, and other objectives of the present invention not mentioned herein will be clearly understood by those of ordinary knowledge in the art on the basis of the following description.

In one aspect, provided is an automated fiber placement (AFP) device for stacking fiber composite materials. The AFP device includes: a feeder configured to feed a sheet-type fiber composite material having a predetermined width; a molding part located downstream of the feeder, including a roller member in a curved shape, and configured to compress the fiber composite material fed from the feeder by the roller member, thereby molding a sheet-type structure; and a compressing part located downstream of the molding part, having a shape corresponding to a shape of an upper surface of the sheet-type structure, and configured to compress the upper surface of the sheet-type structure fed from the molding part, thereby seating the sheet-type structure on a substrate in a state of maintaining the shape of the sheet-type structure. In particular, the compressing part may move from one end to the other end of the substrate, thereby compressing the sheet-type structure.

A term "sheet-type" as used herein refers to a three-dimensional shape of a sheet, film or a thin layer, which has a planar surface and a substantially reduced thickness (e.g., millimeter, micrometer, or nanometer scale) compared to a width or a length of the planar surface.

The molding part may include: a first roller member including (i) a first body portion having a cylindrical shape configured to be rotatable by a first rotational shaft arranged along a width direction of the fiber composite material, and (ii) a pair of first protruding portions, each of the first protruding portions having a cylindrical shape, located at either lateral side of the first body portion, and having an outer diameter greater than that of the first body portion; and a second roller member including (i) a second body portion having a cylindrical shape, located on an upper side of the first roller member in parallel with each other and configured to be rotatable by a second rotational shaft, and (ii) a second protruding portion having a cylindrical shape, located on one lateral side of the second body portion and having an outer diameter less than that of the second body portion.

A term "cylindrical shape" as used herein refers to a three-dimensional shape having a hollow, empty inner space (e.g., rod-shaped) of an object, and the cylindrical shape can be defined with a cross sectional shape having an inner diameter and an outer diameter and a length of an object, where the inner diameter is a diameter of the hollow space in the object and the outer diameter is a diameter of the outer barrier of the cross section of the object.

The molding part may further include a speed control unit, and the speed control unit may include: a first round toothed wheel being in a pair and located on opposite lateral sides of the first roller member; a second round toothed wheel being in a pair and located on opposite lateral sides of the second roller member and engaged with the pair of first round toothed wheels; and a pair of plate-shaped supports located at opposite lateral sides of the pair of the first round toothed wheels and the pair of the second round toothed wheels, respectively.

The molding part may include: a third roller member including a third body portion having a cylindrical shape and configured to be rotatable by a third rotational shaft arranged along a width direction of the fiber composite material, and a third protruding portion having a cylindrical shape, located at each lateral side of the third body portion and having an outer diameter greater than that of the third body portion; and a molding guide located on an upper side of the third roller member in parallel therewith, the molding guide including a first wall body located at one lateral side of the third protruding portion and having a predetermined height, a second wall body located at the other lateral side of the third protruding portion and having a height same as that of the first wall body, and an upper plate connecting the first wall body and the second wall body to each other.

The AFP device may further include a cutter located between the molding part and the compressing part and configured to cut the sheet-type structure at a time when the sheet-type structure is moved by a predetermined distance from one end to the other end of the substrate.

The compressing part may be moved to the other end of the substrate, and a remaining substructure cut from the sheet-type structure by the cutter may be disposed on the substrate, thereby allowing the sheet-type structure of a first row to be disposed on the substrate.

The compressing part may be installed to be movable in all directions on the substrate, move to a width direction of the sheet-type structure of the first row, and seat the sheet-type structure of a second row on the substrate, so that the compressing part may move from one end to the other end of the substrate or from the other end to one end of the substrate, causing a predetermined portion thereof to overlap with the sheet-type structure of the first row or the predetermined portion to contact a lateral side of the sheet-type structure of the first row.

The compressing part may include a fourth roller member having a fourth body portion having a cylindrical shape and configured to be rotatable by a fourth rotational shaft arranged along a width direction of the sheet-type structure, and a fourth protruding portion having a cylindrical shape, located at each lateral side of the fourth body portion and having an outer diameter less than that of the fourth body portion.

The compressing part may include a fifth roller member having a fifth body portion having a cylindrical shape and configured to be rotatable by a fifth rotational shaft arranged along a width direction of the sheet-type structure, and a fifth protruding portion having a cylindrical shape, located at each lateral side of the fifth body portion and having an outer diameter greater than that of the fifth body portion.

The fiber composite material may include a prepreg or a tow prepreg.

The compressing part may be coated with synthetic rubber or polytetrafluoroethylene rubber (e.g., Teflon).

The AFP device may convey the fiber composite material at a conveying speed of about 30 to 60 m/min.

The molding part may be configured such that the second roller member compresses the fiber composite material with pressure of about 4 to 6 $N/mm^2$.

The compressing part may be configured to compress the sheet-type structure with pressure of about 8 to 12 $N/mm^2$.

The present invention is advantageous in that by changing shapes of fiber composite materials, it is possible to minimize defects occurring upon manufacturing preforms, by reducing such defects as generation of gap, overlapping, and step differences between the fiber composite materials when the fiber composite materials are overlapped.

The present invention is also effective in terms of simplification of processes and reduction of production cost, by improving the shape of a roller member in the AFP device and minimizing occurrence of defects without additional process.

The present invention is not limited to the effects described above, and other effects of the present invention not mentioned herein could be clearly understood by those skilled in the art on the basis of the following description.

BRIEF DESCRIPTION OF THE DRAWINGS

The above and other objectives, features, and other advantages of the present invention will be more clearly understood from the following detailed description when taken in conjoint with the accompanying drawings, in which.

DETAILED DESCRIPTION

Figure 1:
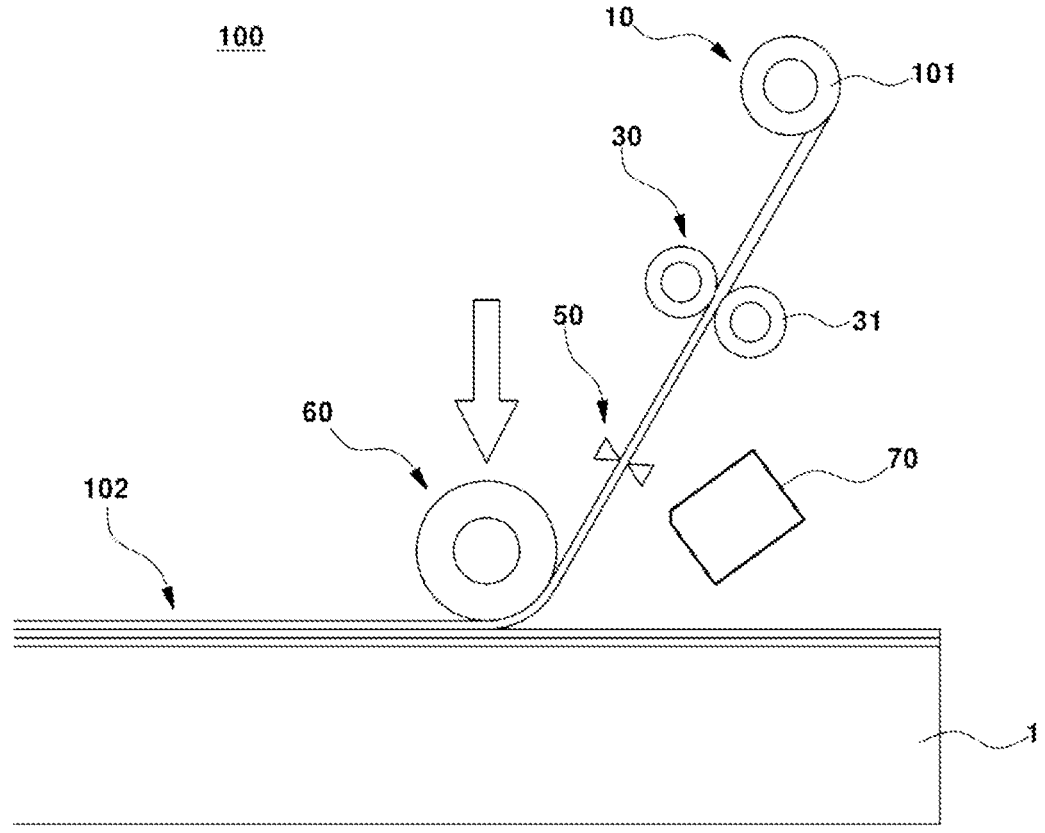
FIG. 1 shows an exemplary automated fiber placement device in accordance with an exemplary embodiment of the present invention.

The above and other objectives, features and advantages of the present invention will be more clearly understood from the following preferred and/or exemplary embodiments when taken in conjunction with the accompanying drawings. The present invention is not limited to the embodiments described herein but may be embodied in different forms. Rather, the exemplary embodiments introduced herein are provided so that the contents disclosed thereby can become exhaustive and complete, and the concept of the present invention can be sufficiently transferred to those skilled in the art.

In describing the drawings, like reference numerals are used to refer to like elements. For the sake of clarity, dimensions of the structures are enlarged more than actual dimensions in the accompanying drawings. It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element. As used herein, the singular forms "a", "an", and "the" are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. In addition, if it is described that a component such as a layer, a film, a region, a plate, etc. is formed on or under another component, it should be understood that a component may be provided directly on or directly under another component, or a component may be interposed between components.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Hereinafter, the automated fiber placement device of the present invention will be described with reference to FIG. 1. Here, FIG. 1 is a view schematically illustrating an automated fiber placement device in accordance with an exemplary embodiment of the present invention.

As shown in FIG. 1, the automated fiber placement device 100 of the present invention includes a feeder 10, a molding part 30, a cutter 50, a compressing part 60, and a heater 70.

Thus, preferably provided herein, inter alia, is an automated fiber placement (AFP) device for stacking fiber composite materials. The AFP device may be a device which is moved by a robotic device as fiber composite materials 101 are supplied, so as to stack the fiber composite materials 101 on a substrate continuously.

As used herein, positions of the elements used herein are referred to as upstream and downstream according to the sequence that the fiber composite materials 101 are conveyed. In the present invention, a position in the front sequence is referred to as "upstream" and a position in the next sequence following the front sequence is referred to as "downstream".

Preferably, the feeder 10 may feed a sheet-type fiber composite material 101 having a predetermined width.

The feeder 10 may be provided in the form of plural reels as applicable, for example, each reel may be embodied in such a manner that each reel is wound with the fiber composite material 101.

The fiber composite material 101 may include prepreg or tow prepreg. Preferably, thermoplastic polymer resin may be impregnated in the high strength fiber, which is called prepreg, and the high molecule resin is impregnated in the high strength fiber of one strand, having the form of prepreg in a tow shape, which is called tow prepreg.

Preferably, the molding part 30 is located downstream of the feeder 10 and includes a roller member 31 in a curved shape, molding a sheet-type structure 102 by pressing the fiber composite material 101 fed from the feeder 10.

The molding part 30 may provide smooth conveyance and tension maintenance of the fiber composite material 101, and the roller member 31 may be configured to have a width broader than the width of the fiber composite material 101.

The cutter 50 is located between the molding part 30 and the compressing part 60 and can cut the structure 102 at the time when the compressing part 60 is moved from one end to the other end of the substrate 1 by a predetermined distance.

The compressing part 60 may be located downstream of the molding part 30 and may have a shape corresponding to the shape of an upper surface of the structure 102, compressing the upper surface of the structure fed from the molding part 30, to thereby seat the structure 102 on the substrate 1 in a state that the shape of the structure 102 is maintained.

The compressing part 60 may move from one end to the other end of the substrate 1 so as to compress the structure 102.

In particular, the compressing part 60 moves to the other end of the substrate 1, and the remaining structure 102 cut by the cutter 50 is disposed on the substrate, thereby being capable of disposing the structure of a first row on the substrate 1.

The compressing part 60 may be installed to be movable in all directions on the substrate 1. The compressing part 60 may move to a width direction of the structure of the first row and may move from one end to the other end of the substrate 1 or from the other end to one end of the substrate 1, thereby allowing a certain portion thereof to be overlapped with the structure of the first row or disposing the structure of a second row so as to be met with a lateral side of the structure of the first row.

The compressing part 60 may be suitably coated with synthetic rubber or polytetrafluoroethylene rubber (e.g., Teflon) so as to minimize damage to the fiber composite material 101 and facilitate release of the fiber composite material 101.

The compressing part 60 may be configured to compress the structure 102 with pressure of 8 to 12 $N/mm^2$. When the pressure is less than about 8 to 12 $N/mm^2$, an error in stacking and arranging the fiber composite material 101 may occur. When the pressure is greater than about 8 to 12 $N/mm^2$, distortion and separation of the fiber composite material 101b already stacked and arranged may occur.

The heater 70 may be installed inside the automated fiber placement device 100, being capable of irradiating the structure 102 with heat.

The automated fiber placement device 100 may convey the fiber composite material 101 at the conveying speed of 30 to 60 m/min. When the conveying speed is less than about 30 m/min, degradation in workability may occur, and when the conveying speed is greater than about 30 m/min, twisting of the fiber composite material 101 may occur.

Figure 2:
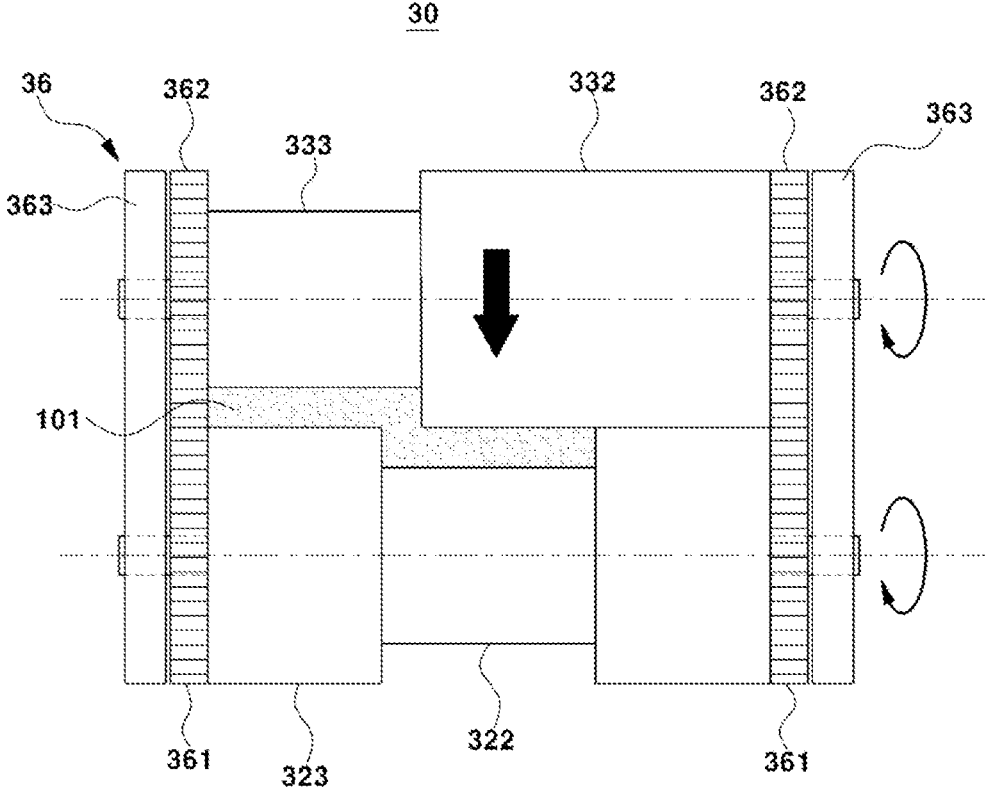
FIG. 2 shows a first exemplary embodiment of a molding part.
Figure 3:
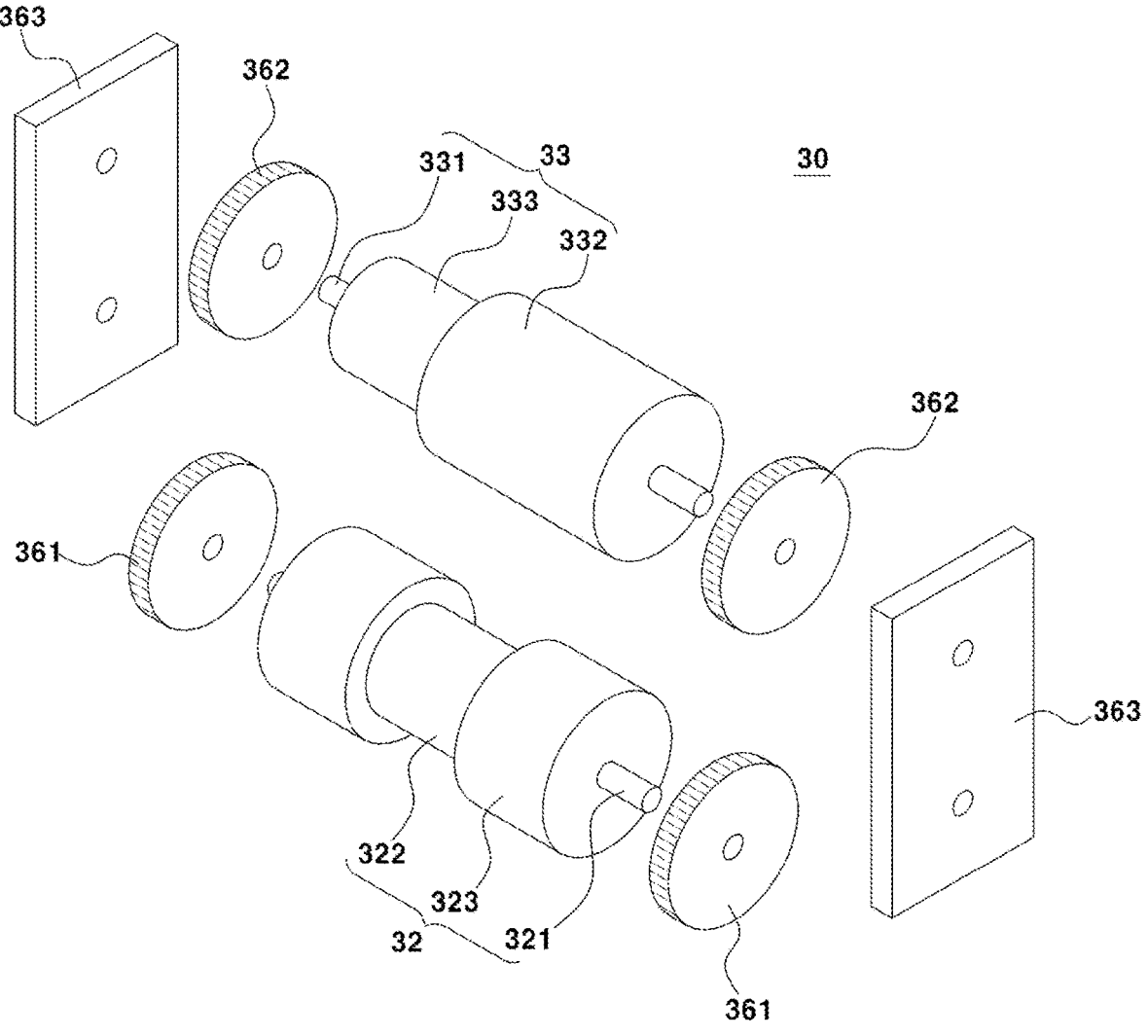
FIG. 3 shows an exploded molding part of FIG. 2.

The first exemplary embodiment of the molding part is described below with reference to FIGS. 2 and 3. For example, FIG. 2 is a view illustrating a first exemplary embodiment of the molding part, and FIG. 3 is a view illustrating an exploded molding part of FIG. 2.

The molding part 30 may be located downstream of the feeder and may include a first roller member 32, a second roller member 33, and a speed regulator 36. The first roller member 32 may move the fiber composite material 101, the second roller member 33 may mold a shape of the fiber composite material 10. The fiber composite material 101 conveyed between the first roller member 32 and the second roller member 33 can be maintained, e.g., in the "Z" shape during the conveyance thereof.

The first roller member 32 may be configured to include a first rotational shaft 321, a first body portion 322, and a pair of first protruding portion 323.

The first body portion 322 may have a cylindrical shape and be rotatable by the first rotational shaft 321 arranged along the width direction of the fiber composite material 101.

Preferably, the each of the pair of first protruding portions 323 is located each at either lateral side of the first body portion 322 and may have a cylindrical shape, having an outer diameter greater than that of the first body portion 322.

Preferably, the second roller member 33 is located upward of and in parallel with the first roller member 32 and may include a second rotational shaft 331, a second body portion 332, and a second protruding portion 333.

The second roller member 33 may compress the fiber composite material 101 with pressure of about 4 to 6 N/mm$^2$. When the pressure is less than about 4 N/mm$^2$, additional compression may be required because of insufficient realization of an improved shape. When the pressure is greater than about 6 N/mm$^2$, trapping of the fiber composite material 101 may occur upon conveying the fiber composite material 101 to the compressing part.

The second body portion 332 may have a cylindrical shape and be rotatable by the second rotational shaft 331 arranged along the width direction of the fiber composite material 101.

The second protruding portion 333 is located at one lateral side of the second body portion 332 and may have a cylindrical shape, having an outer diameter less than that of the second body portion 332.

The speed regulator 36 is directed to securing manipulability of compression and conveying speed and process reproducibility and may include a first round toothed wheel 361, a second round toothed wheel 362, and a support 363.

The first round toothed wheel 361 may be in a pair and located at opposite lateral sides of the first roller member 32.

The second round toothed wheel 362 may be in a pair and located at opposite lateral sides of the second roller member 33, being engaged with the pair of first round toothed wheel 361.

The support 363 is plate-shaped and may be coupled to lateral sides of both the pair of first round toothed wheels 361 and the pair of second round toothed wheels 362.

Figure 4:
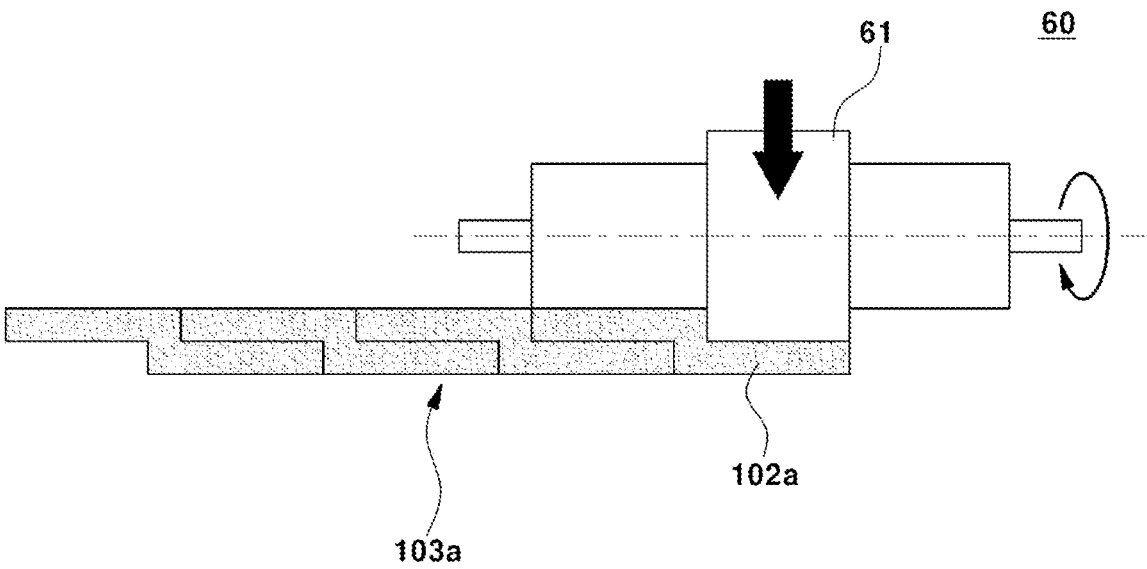
FIG. 4 shows a first exemplary embodiment of a compressing part.
Figure 5:
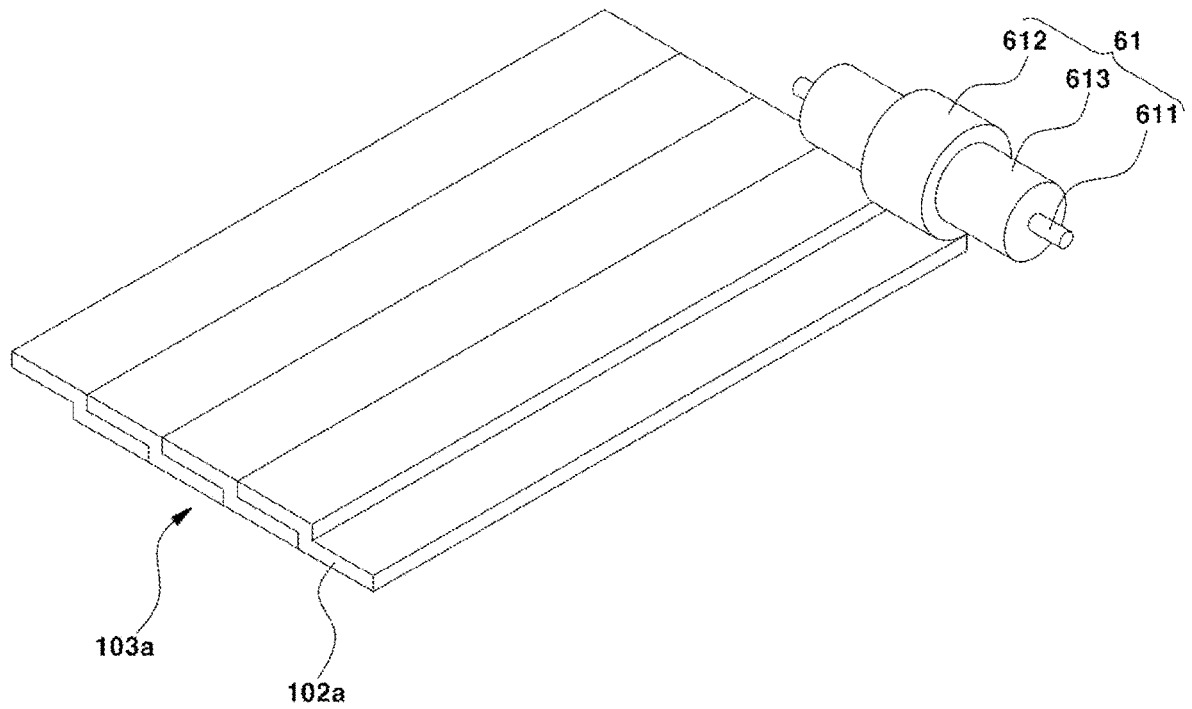
FIG. 5 shows an exemplary arrangement of preforms in accordance with the first exemplary embodiment of the compressing part.

The first exemplary embodiment of the compressing part is described below with reference to FIGS. 4 and 5. FIG. 4 shows the first exemplary embodiment of the compressing part and FIG. 5 is a view schematically illustrating arrangement of preforms in accordance with the first exemplary embodiment of the compressing part.

The compressing part 60 may be located downstream of the molding part and may include a fourth roller member 61 having a fourth rotational shaft 611, a fourth body portion 612, and a fourth protruding portion 613.

The fourth body portion 613 may have a cylindrical shape and be rotatable by the fourth rotational shaft 611 arranged along the width direction of the structure 102a.

The fourth protruding portion 613 may be located at each lateral side of the fourth body portion 612 and may have a cylindrical shape 613, having an outer diameter less than that of the fourth body portion 612.

The automated fiber placement device according to the first exemplary embodiment of the present invention may manufacture a preform 103a, by overlapping the structure 102a compressed by the compressing part 60 in the "Z"

shape, whereby such defects as gap, overlapping, and step differences between the fiber composite materials occurring upon overlapping the fiber composite materials can be reduced.

The automated fiber placement device according to the second exemplary embodiment of the present invention is described below. The second exemplary embodiment may provide a structure in a different shape, and thus, the second exemplary embodiment may be identical to the first exemplary embodiment except the change in the molding part and the compressing part.

Figure 6:
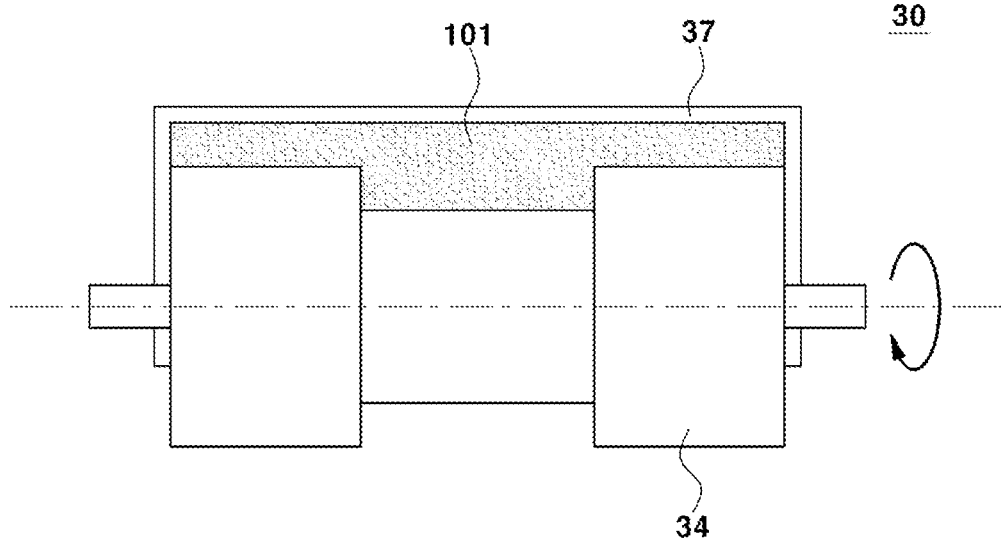
FIG. 6 shows a second exemplary embodiment of the molding part.
Figure 7:
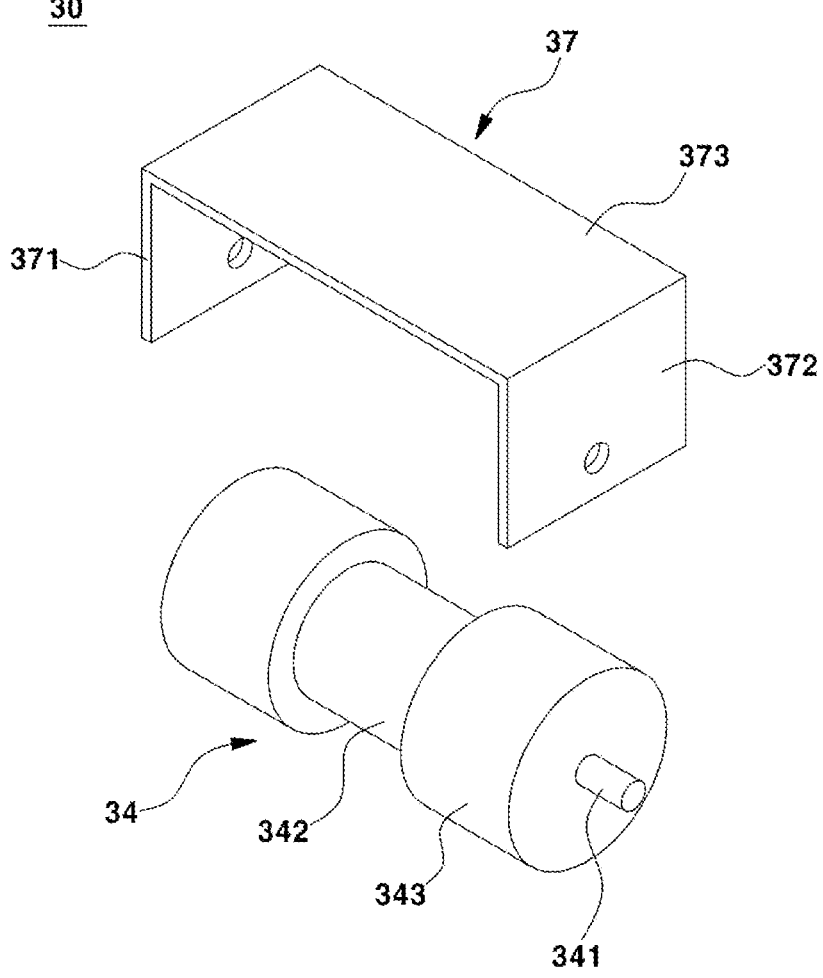
FIG. 7 shows an exploded molding part of FIG. 6.

The second exemplary embodiment of the molding part is described below with reference to FIGS. 6 and 7. FIG. 6 shows a second exemplary embodiment of the molding part, and FIG. 7 shows an exploded molding part of FIG. 6.

The molding part 30 is located downstream of the feeder and may include a third roller member 34 and a molding guide 37. The third roller member 34 may convey the fiber composite material 101 and the molding guide 37 may mold the shape of the fiber composite material. The fiber composite material 101 conveyed between the third roller member 34 and the molding guide 37 may be maintained in the "T" shape during the conveyance thereof.

The third roller member 34 may include a third rotational shaft 341, a third body portion 342, and a third protruding portion 343.

The third body portion 342 may have a cylindrical shape and be rotatable by the third rotational shaft arranged along with width direction of the fiber composite material 101.

The third protruding portion 343 may be located at each lateral side of the third body portion 342 and may have a cylindrical shape, having an outer diameter greater than that of the third body portion 342.

The molding guide 37 may be located on the upper side of the third roller member 34 in parallel with each other and may include a first wall body 371, a second wall body 372, and an upper plate 373.

The first wall body 371 may be located at one lateral side of the third protrusion portion 343 and may have a predetermined height.

The second wall body 372 may be located at the other lateral side of the third protruding portion 343 and may have the height same as that of the first wall body 371.

The upper plate 373 may connect the first wall body 371 and the second wall body 372 to each other.

Figure 8:
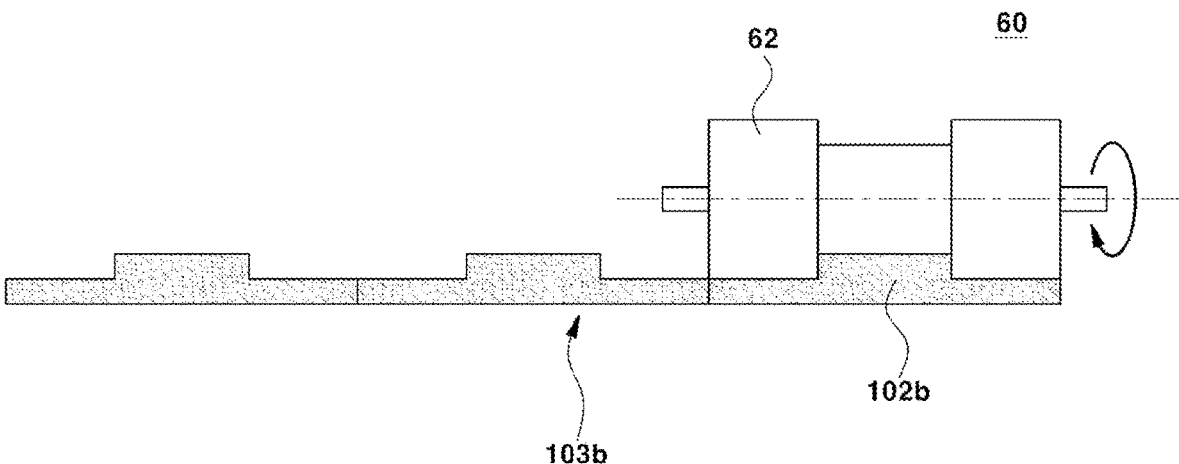
FIG. 8 shows a second exemplary embodiment of the compressing part.
Figure 9:
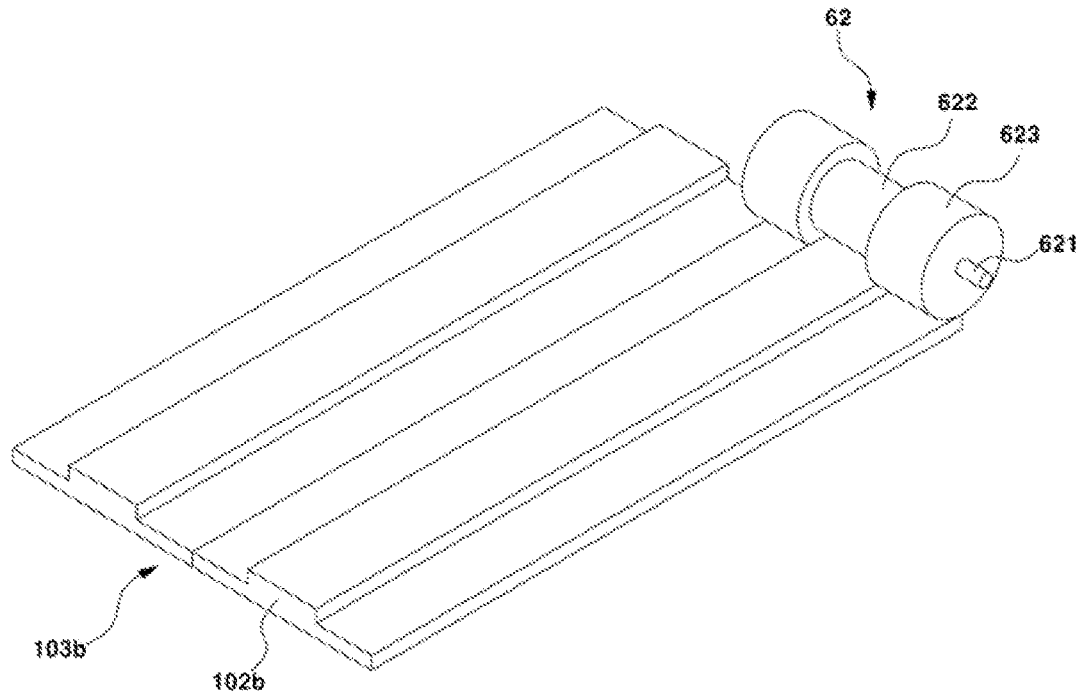
FIG. 9 shows an exemplary arrangement of preforms in accordance with the second exemplary embodiment of the compressing part.

The second exemplary embodiment of the compressing part is described below with reference to FIGS. 8 and 9. FIG. 8 shows a second exemplary embodiment of the compressing part, and FIG. 9 shows illustrating arrangement of preforms in accordance with the second exemplary embodiment of the compressing part.

The compressing part 60 may be located downstream of the molding part and may be configured to include a fifth roller member 62 having a fifth rotational shaft 621, a fifth body portion 622, and a fifth protruding portion 623.

The fifth body portion 622 may have a cylindrical shape, being rotational by the fifth rotational shaft 621 arranged along the width direction of the structure 102b.

The fifth protruding portion 623 may be located at each lateral side of the fifth body portion 622 and may have a cylindrical shape, having an outer diameter greater than that of the fifth body portion 622.

The automated fiber placement device according to the second exemplary embodiment of the present invention may manufacture a preform 103b, by overlapping the structure 102b compressed by the compressing part 60 in the "T" shape, whereby such defects as gap, overlapping, and step differences between the fiber composite materials occurring upon overlapping the fiber composite materials can be reduced.

The automated fiber placement device according to various exemplary embodiments of the present invention can minimize defects occurring upon manufacturing preforms, by changing shapes of fiber composite materials, resulting in reducing such defects as generation of gap, overlapping, and step differences between the fiber composite materials when the fiber composite materials are overlapped, In addition, the automated fiber placement device according to various exemplary embodiments of the present invention is also effective in terms of simplification of processes and reduction of production cost, by improving the shape of a roller member in the AFP and minimizing defects without additional process.

Although the present invention was described with reference to exemplary embodiments shown in the drawings, it is apparent to those skilled in the art that the present invention may be changed and modified in various ways without departing from the scope of the present invention, which is described in the following claims.

What is claimed is:

1. An automated fiber placement (AFP) device for stacking fiber composite materials, comprising:
    a feeder configured to feed a sheet-type fiber composite material having a predetermined width;
    a molding part located downstream of the feeder, including a roller member in a curved shape, and configured to compress the sheet-type fiber composite material fed from the feeder by the roller member, thereby molding a sheet-type structure, the molding part comprising:
    a first roller member comprising:
    a first body portion having a cylindrical shape having a constant outer diameter along its longitudinal axis and configured to be rotatable by a first rotational shaft arranged along a width direction of the sheet-type fiber composite material, and
    a pair of first protruding portions, each of the first protruding portions having a cylindrical shape having a constant outer diameter along their longitudinal axes, located at either lateral side of the first body portion and each having an outer diameter greater than that of the first body portion; and
    a second roller member comprising:
    a second body portion having a cylindrical shape having a constant outer diameter along its longitudinal axis, located on an upper side of the first roller member in parallel with each other and configured to be rotatable by a second rotational shaft, and
    a second protruding portion having a cylindrical shape having a constant outer diameter along its longitudinal axis located on only one lateral side of the second body portion and having an outer diameter less than that of the second body portion;
    wherein the molding part is configured to press the fiber composite material in the direction of its thickness between one of the first protruding portions and the second protruding portion, between the first body portion and the second protruding portion, and between the first body portion and the second body portion; and
    a compressing part located downstream of the molding part, having a shape corresponding to a shape of an upper surface of the sheet-type structure, and configured to compress the upper surface of the sheet-type structure fed from the molding part, thereby disposing the sheet-type structure on a substrate in a state of maintaining the shape of the sheet-type structure,
    wherein the compressing part moves from one end to the other end of the substrate.

2. The AFP device of claim 1, wherein the molding part further comprises a speed control unit, the speed control unit comprising:
    a first round toothed wheel being in a pair and located on opposite lateral sides of the first roller member;
    a second round toothed wheel being in a pair and located on opposite lateral sides of the second roller member and engaged with the pair of first round toothed wheels; and
    a pair of plate-shaped supports located at opposite lateral sides of the pair of the first round toothed wheels and the pair of the second round toothed wheels, respectively.

3. The AFP device of claim 1, further comprising:
    a cutter located between the molding part and the compressing part and configured to cut the sheet-type structure at a time when the sheet-type structure is moved by a predetermined distance from one end to the other end of the substrate.

4. The AFP device of claim 3, wherein the compressing part is moved to the other end of the substrate, and a remaining substructure cut from the sheet-type structure by the cutter is disposed on the substrate, thereby allowing the sheet-type structure of a first row to be disposed on the substrate.

5. The AFP device of claim 4, wherein the compressing part is installed to be movable in all directions on the substrate, moves to a width direction of the sheet-type structure of the first row, and seats the sheet-type structure of a second row on the substrate, so that the compressing part moves from one end to the other end of the substrate or from the other end to one end of the substrate, causing a predetermined portion thereof to overlap with the sheet-type structure of the first row or the predetermined portion to contact a lateral side of the sheet-type structure of the first row.

6. The AFP device of claim 1, wherein the compressing part comprises:
    a fourth roller member having a fourth body portion having a cylindrical shape and configured to be rotatable by a fourth rotational shaft arranged along a width direction of the sheet-type structure, and
    a pair of fourth protruding portions, each of the fourth protruding portions having a cylindrical shape, located at either lateral side of the fourth body portion and each having an outer diameter greater than that of the fourth body portion.

7. The AFP device of claim 1, wherein the sheet-type fiber composite material comprises prepreg or tow prepreg.

8. The AFP device of claim 1, wherein the compressing part is coated with synthetic rubber or polytetrafluoroethylene rubber.

9. The AFP device of claim 1, wherein the AFP device conveys the sheet-type fiber composite material at a conveying speed of about 30 to 60 m/min.

10. The AFP device of claim 1, wherein the molding part is configured such that the second roller member compresses the sheet-type fiber composite material with a pressure of about 4 to 6 N/mm$^2$.

11. The AFP device of claim 1, wherein the compressing part is configured to compress the sheet-type structure with a pressure of about 8 to 12 N/mm$^2$.

12. An automated fiber placement (AFP) device for stacking fiber composite materials, comprising:

a feeder configured to feed a sheet-type fiber composite material having a predetermined width;

a molding part located downstream of the feeder, including a roller member in a curved shape, and configured to compress the sheet-type fiber composite material fed from the feeder by the roller member, thereby molding a sheet-type structure, wherein the molding part comprises:

a third roller member comprising:

a third body portion having a cylindrical shape having a constant outer diameter along its longitudinal axis and configured to be rotatable by a third rotational shaft arranged along a width direction of the sheet-type fiber composite material, and a pair of third protruding portions, each of the third protruding portions having a cylindrical shape having a constant outer diameter along their longitudinal axes, located at either lateral side of the third body portion and each having an outer diameter greater than that of the third body portion; and a molding guide located on an upper side of the third roller member in parallel therewith, the molding guide comprising:

a first wall body located at an outer lateral side of one of the third protruding portions and having a predetermined height, a second wall body located at an outer lateral side of the other third protruding portion and having a height same as that of the first wall body, and an upper plate extending over the first wall body and second wall body and connecting and fixing the first wall body and the second wall body to each other;

wherein the molding part is configured to press the fiber composite material in the direction of its thickness between the third roller member and the molding guide; and a compressing part located downstream of the molding part, having a shape corresponding to a shape of an upper surface of the sheet-type structure, and configured to compress the upper surface of the sheet-type structure fed from the molding part, thereby disposing the sheet-type structure on a substrate in a state of maintaining the shape of the sheet-type structure;

wherein the compressing part moves from one end to the other end of the substrate.

13. The AFP device of claim 12, wherein the compressing part comprises:

a fifth roller member comprising a fifth body portion having a cylindrical shape and configured to be rotatable by a fifth rotational shaft arranged along a width direction of the sheet-type structure, and a pair of fifth protruding portions, each of the fifth protruding portions having a cylindrical shape, located at either lateral side of the fifth body portion and each having an outer diameter greater than that of the fifth body portion.

14. The AFP device of claim 12, further comprising:

a cutter located between the molding part and the compressing part and configured to cut the sheet-type structure at a time when the sheet-type structure is moved by a predetermined distance from one end to the other end of the substrate.

15. The AFP device of claim 12, wherein the sheet-type fiber composite material comprises prepreg or tow prepreg.

16. The AFP device of claim 12, wherein the compressing part is coated with synthetic rubber or polytetrafluoroethylene rubber.

17. The AFP device of claim 12, wherein the AFP device conveys the sheet-type fiber composite material at a conveying speed of about 30 to 60 m/min.

* * * * *